United States Patent [19]

Anspaugh et al.

[11] 4,448,381

[45] May 15, 1984

[54] MOTOR MOUNT STRUCTURE FOR VEHICLE SEAT ADJUSTMENT APPARATUS

[75] Inventors: Dennis J. Anspaugh, Osseo; Ronald R. Siegrist, Jackson, both of Mich.

[73] Assignee: International Telephone and Telegraph Corporation, New York, N.Y.

[21] Appl. No.: 356,849

[22] Filed: Mar. 10, 1982

Related U.S. Application Data

[63] Continuation of Ser. No. 111,598, Jan. 14, 1980.

[51] Int. Cl.³ .................................................. A45D 19/04
[52] U.S. Cl. ..................................... 248/394; 248/429
[58] Field of Search ............... 248/394, 395, 429, 675, 248/607, 201, 615; 5/68; 297/330; 310/112; 411/521

[56] References Cited

U.S. PATENT DOCUMENTS

| | | | |
|---|---|---|---|
| 1,824,255 | 9/1931 | Bishop | 248/675 |
| 2,717,969 | 9/1955 | Buchhold et al. | 310/112 |
| 3,191,196 | 6/1965 | Holm | 5/68 |
| 3,227,410 | 1/1966 | McCuen | 248/201 |
| 3,232,571 | 2/1966 | Josephson | 248/201 |
| 3,365,163 | 1/1968 | Pickles | 248/394 X |
| 3,468,389 | 9/1969 | Nelson | 248/613 |
| 3,796,124 | 3/1974 | Crosa | 411/521 |
| 3,951,004 | 4/1976 | Heesch | 248/394 X |
| 4,015,812 | 4/1977 | Heesch | 248/394 |
| 4,209,723 | 6/1980 | Hamman | 310/112 |

*Primary Examiner*—Francis K. Zugel
*Attorney, Agent, or Firm*—James B. Raden; Marvin M. Chaban

[57] ABSTRACT

An apparatus for fixing the relative position of components within an automotive seat track mechanism. Such mechanisms are conventionally powered by electric motor drive, such as a motor with multiple armatures or by using separate motors mounted on a unitary platform or by using clutch activated members driven by a single motor. The output of the motor drive is transmitted through respective gearing to lead screws or rack and pinions within or adjacent to the tracking structures at both sides of the seat to translate the seat horizontally. The motor drive output is also transmitted to operate individual lead screws or rack and pinions within or adjacent one structure for the vertical seat movements. The motor mount is secured to the tracking structure at one side of the seat. A simple light weight holding rod secures the motor mount to the opposed side structure to produce a rigid, yet readily detachable motor mount. The motor mount can more readily withstand shock and vibration, especially during shipping and assembly of the seat track mechanism.

3 Claims, 3 Drawing Figures

MOTOR MOUNT STRUCTURE FOR VEHICLE SEAT ADJUSTMENT APPARATUS

This is a continuation of application Ser. No. 111,598 filed Jan. 14, 1980.

BACKGROUND OF THE INVENTION

Apparatus for the power adjustment or position setting of automotive seats are extremely well-known in the art. The power in many cases is supplied either by separate reversible motors, one for each movement or by clutch mechanisms driven by a single reversible motor. The apparatus of the present invention may be powered by any of the cited drive motor arrangements, with the drive motor or motors supported unitarily on a single platform or joined together in any well-known fashion.

To provide the drive from the motor or motors to the output mechanisms, various types of mechanical mechanisms and linkages are used. For example, in U.S. Pat. No. 3,437,303 to J. Pickles dated Apr. 8, 1969 a rack and pinion mechanism is driven by flexible cable members to produce the horizontal movement. Worm and threaded shaft engagement are frequently used to produce both vertical movements from the respective drive members. Other patents such as U.S. Pat. No. 2,961,032 issued Nov. 22, 1960 to Ferro Mfg. disclose similar structures. U.S. Pat. No. 4,015,812 issued Apr. 5, 1977 M. O. Heesch shows a typical structure for a seat mechanism of a more recent date.

Where the motor is attached to the drive side by the use of a platform, the opposite side of the motor is unsupported and free to vibrate. During shipping and assembly in the car, the power seat adjuster is subjected to many shocks and vibrations. The vibrations may cause the slave side flexible shaft to become dislodged, thus, rendering the power seat adjuster assembly fully or partially inoperable. In the known art, support has been provided by the use of additional brackets attached with screws and rivets. Assembly of such brackets is difficult and these platforms or brackets add considerable weight. For example, see U.S. Pat. No. 4,015,812 to M. O. Heesch dated Apr. 5, 1977 for the use of heavy bracing structure for both sides of the motor mount. Tolerance buildup within the seat adjuster assembly is extremely difficult to absorb with the bracket method of assembly. Problems further may be created by using a short bracket with a wide tolerance of width controlling parts leading to the need for high torque on the mounting screw. The torque creates undue stress within the assembly and does not allow the adjuster to operate within the time limits prescribed by auto manufacturer specifications. Economic and weight considerations do not allow for the addition of a second bracket or adding enough extra material to the existing bracket to stabilize the slave side of the motor.

SUMMARY OF THE INVENTION

The present invention is used in a mechanism which provides up to six adjustments controlled by a motor mounted between the lateral end tracking structures of a seat adjusting device.

It is therefore an object of the invention to provide an improved motor mount structure for a power driven seat track apparatus.

It is a further object of the invention to provide a light weight readily attachable and detachable motor mount reinforcing structure for a powered seat track.

It is a further object of the invention to provide a powered seat apparatus in which the power is provided by motor structure which is secured to the seat track structure at one side, and in which the motor structure is secured to the other or slave side for stability by simple, light-weight means which are readily attachable and detachable.

It is a still further object of the invention to provide powered seat apparatus for a vehicle in which the power is supplied from one or more motors jointly mounted and secured to one track member and in which the motor mounting is braced to the other side track by means of a single rod having one end secured suitably to the motor mount and having its other end stepped to mate with and supportingly engage the track structure.

Other objects, features and advantages of the invention will become apparent from the following specification viewed in conjunction with the drawings which are described briefly next.

DETAILED DESCRIPTION OF THE DRAWINGS

Figure 1:
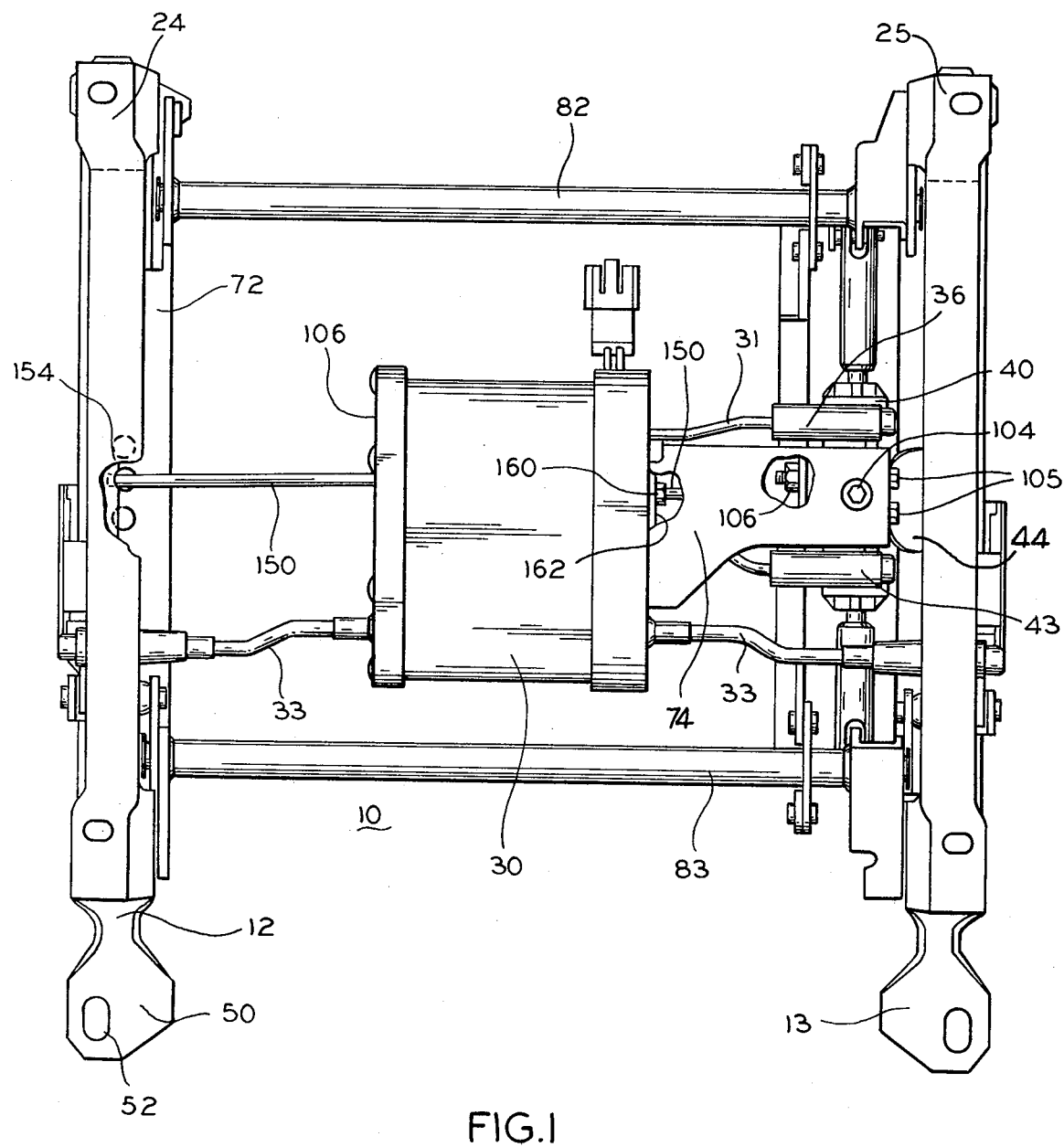
FIG. 1 is a plan view of an apparatus viewed from the front thereof employing a preferred embodiment of my invention.
Figure 2:
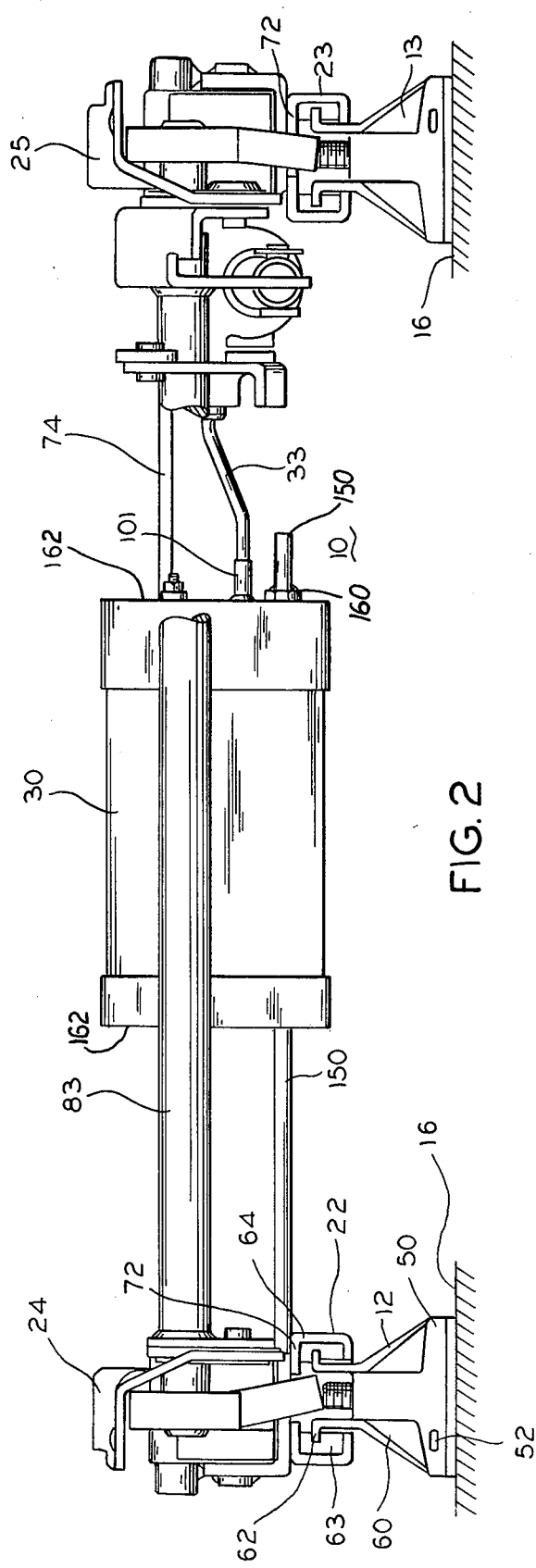
FIG. 2 is a front elevational view of the apparatus of FIG. 1.

In FIGS. 1 and 2, we show an apparatus 10 emplying a preferred embodiment of my invention. The apparatus has two transversely-spaced generally U-shaped structural mounting side or base rails 12 and 13, each of which is suitably affixed by bolts or the like to the floor 16 of the vehicle. The two base rails 12 and 13 are parallel to one another and are spaced a lateral distance from one another to receive and support a vehicle seat on the two rails.

The major structural elements of the apparatus 10 are the respective side or base rails 12 and 13, each of which is affixed to the stationary floor structure of the vehicle; and a longitudinally translatable carriage which is secured to the seat (not shown). The carriage is generally comprised of two spaced-apart slides 22 and 23, each being engaged with a like base rail 12 and 13 in a tracked relationship allowing horizontal front to rear slide movement. Seat securing brackets 24 and 25 rest above each slide of the apparatus and are secured to the carriage at the front and rear of each slide 22 and 23. The brackets 24 and 25 are pivoted at both their longitudinal ends to the carriage and carry a seat by connection at the front and rear seat ends.

Controlled drive, translatory motion of the carriage 20 produces longitudinal movement of the seat in a fore and aft sense in response to selection at devices (not shown). Movements within the carriage of the front and rear controlled drive produce selective vertical movement of either the front or the rear end of the seat securing brackets 24 and 25 and consequent movement of the front or rear end of the seat respectively. Brackets 24 and 25 are generally conventional, each secured above and generally co-extensive with a rail and its engaged track.

In the drawings, we show as a drive for the apparatus a three-armature motor 30 of a type well-known in the art. The motor has a rigid housing or casing with suitable end bell structure enclosing three output dirve shafts, the motor being supported intermediately in the apparatus 10 between the mounting base rails. Suitable other motor-controlled drives, such as a single motor with three individually selectable clutch drive shafts or three separate motors mounted (in parallel with one another), could also be used. In any event, there would be an output shaft from each motor-controlled drive. The three output shafts of the motor drives are connected to respective driven assemblies of the apparatus.

The motor drive output armature or shafts each are engaged to and rotate an internal drive within enclosing flexible tubes 31 a third tube, as is conventional, not being shown by the drawings and 33 respectively, the cable and tube being of known design, the cable within a tube herein being of any conventional type. The internal cable for each shaft may, in any conventional manner, rotate a suitable driven gear (not shown) within the enclosing socket 36 of a respective one of the gear boxes 40, the gear boxes being of the type shown in U.S. Pat. No. 3,951,004 issued Apr. 20, 1976 to M. O. Heesch. Four such gear boxes or transmissions are provided, two being driven by one output tube 33 as shown in FIG. 1 by the drive at tubes at each lateral end of the motor. The gear boxes of the drive assemblies are essentially identical in internal construction and operation. The engagement of each shaft cable with the driven shaft within socket 36 is disengageable as is well-known in the art in any manner which permits component replacement and the like.

Each base rail 12 (or 13) of the apparatus is a unitary, rigid structural member having stepped, outwardly extending flanges 50. The web of the base rail is supported by the apparatus mounting brackets at both the front and the rear, the central section being raised between the feet. Suitable apertures or mounting holes 52 in the brackets allow the base rails 12 to be affixed to suitable floor support structure of the vehicle.

The sides 60 of the mounting base rail (shown best in FIG. 3) are parallel and terminate in outwardly facing horizontal flange members 62. Suitable plastic guides 63 are mounted and may be adhered to these flange members to provide a continuous sliding medium between the flange members 62 of rail 12 (and 13), and the inwardly open channel slide track members 64 within which these flange members are tracked. The slide track members 64 form the lower extremity of one slide 22 of the translatable sliding carriage. The track members 64 essentially comprise a unitary beam formed by the two C-section tracks joined together structurally by a horizontal wall 72. The horizontal drive assemblies are mounted on the carriage horizontal wall 72 in the area above the respective base rail members.

As seen best in FIG. 1, the carriage includes sturcture mounted on two transversely spaced-apart slide tracks 22 and 23 movable jointly along the stationary rails 12 and 13 in a fore and aft or front to rear sense. Structurally, the carriage includes a transverse platform structure 74 affixing the motor 30 midway between the rails. A rear torsion bar 82 and a front torsion bar 83 are each laterally disposed between tracks 22 and 23. The bars are each mounted to the tracks 22 and 23 to span the space between the tracks at the respective front and rear of the carriage. Pivotally linked to the torsion bars are seat securing brackets 24 and 25 which are positioned above the respective tracks.

The motor 30 is mounted with its plural shafts disposed laterally of the apparatus between the rails of the mechanism reinforced by means of platform 74. The platform 74 has channel walls for mounting respectively to the motor and to the adjacent track 23. Platform 74 mounts to the motor by engaging the motor end wall between the shaft sockets 101 in any suitable manner such as the mounting shown in cited Heesch U.S. Pat. No. 4,015,812; the platform is secured at its other end to the slide rail 23.

Platform 74 is firmly attached to the mounting bracket 44 which is also used to support gear boxes 40 and 43 by means of a single screw 104. As seen best in FIG. 1, the gear boxes are firmly bolted by bolts 105 (with nuts 106) to bracket 44 which is riveted to the side mechanism. As viewed in FIG. 1, the right side gear box 43 is positioned toward the front of assembly 10, and box 40 toward the rear of assembly 10, both boxes having their input axis substantially alignable with the respective motor output shaft.

Figure 3:
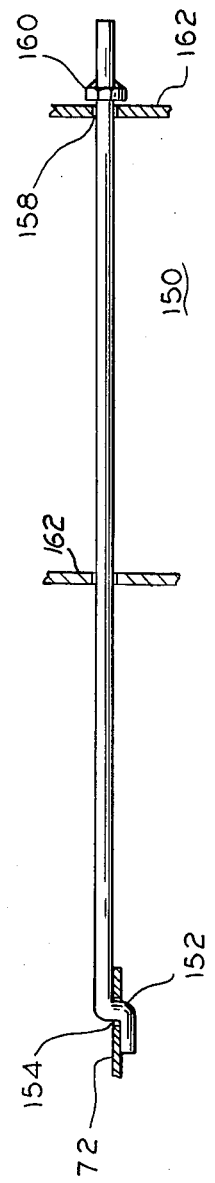
FIG. 3 is a side view in elevation of the holding rod used herein.

To overcome the problem of providing stabilizing lateral support for the motor, we provide rod 150 which extends laterally from the motor to the slide rail 22 on the non-driven or slave side of the mechanism. At its slave side end, as shown in FIG. 3, the rod is offset at step 152 to fit through the sized circular opening 154 in the stationary top surface 72 of slide rail 22. The opening 154 is sized to receive the rod with a clearance fit.

The length of the rod extends from the slide rail 22 to the motor assembly and extends through the end bells or end caps of the motor with a clearance fit through opening 158 (FIG. 3). At the end of the rod adjacent the drive side, a self threading nut 160 of the type which can be purchased under the trade name Palnut is placed on the rod. Such nuts are well-known in the art and nut 160 may be pressed onto the end of the rod 150 and tightened against the end bell wall 162 as shown in FIGS. 2 and 3. The nut is, of course, larger than the hole or opening in the motor end wall and will hold the rod to the motor.

In mounting the rod, the straight end of rod 150 is passed through the opening 158 in the motor mount or end bell 162 as shown in FIGS. 2 and 3. The stepped end 152 is fitted into the opening 154 in the horizontal slide rail surface 72. The rod 150 is drawn tightly to fit the vertical riser of the step within opening 154. The nut 160 is then placed on the straight end of the rod 150 and forced tightly against the end bell as shown in FIGS. 2 and 3 to hold the rod firmly in place.

The present invention allows the motor to be stabilized without the use of any second bracket or the addition of any large amount of weight. The stabilizer rod is held securely to the slave side track sub-assembly by hooking the offset in one end of the rod through a hole in the upper track. The rod is then assembled through two holes in the motor and placed in tension when the motor is attached to the drive side with the motor bracket and the self threading nut is placed on the rod and tightened against the motor. This eliminates any excessive vibration of the slave side of the motor which might dislodge a flexible shaft and render the power seat adjuster assembly inoperable.

We claim:

1. A motor vibration reducing apparatus for a power adjusting mechanism for a vehicle seat, comprising: first and second transversely spaced apart base rails arrayed fore and aft in said vehicle, a first and a second slide track with the slide tracks tracked relative to the respective rails for longitudinal driven movement therealong, a motor drive unit including a plurality of output shafts extending transversely between said rails, slide track drive members coupled to respective ones of said output shafts for driving said tracks on operation of the motor drive unit, a motor housing structure enclosing said motor drive unit, said motor housing structure including transversely opposed end walls, platform structure secured to said housing structure for rigidly securing one end wall of said motor unit to the adjacent one of said slide tracks for longitudinal movement therewith, the invention comprising means for preventing undue longitudinal vibration of the motor unit comprising a rigid elongated rod laterally extending through the housing structure of the motor drive unit and engaged with the other of said slide tracks, and means affixing one end of said rod firmly adjacent said one end wall, said rod extending through the other end wall and extending to drop-in engagement with the other of said slide tracks transversely adjacent said motor unit to stabilize said motor unit.

2. A motor vibration reducing apparatus for a power seat adjusting mechanism as claimed in claim 1, in which the engagement of said rod to the other slide track comprises a stepped end of the rod protruding through an opening in said track sized to receive the rod end.

3. A motor vibration reducing apparatus for a power seat adjusting mechanism as claimed in claim 2, in which said means for affixing the rod to said one end wall comprises a snap-on fastener affixed to said rod outwardly of said one end wall of said housing structure.

* * * * *